United States Patent [19]

Meyer et al.

[11] Patent Number: 5,907,828
[45] Date of Patent: *May 25, 1999

[54] SYSTEM AND METHOD FOR IMPLEMENTING AND ADMINISTERING LENDER-OWNED CREDIT LIFE INSURANCE POLICIES

[76] Inventors: Bennett S. Meyer, 8205 Westminster Rd., Elkins Park, Pa. 19117; William D. Chatfield, 5 East Buck Rd., Downington, Pa. 19335

[ * ] Notice: This patent issued on a continued prosecution application filed under 37 CFR 1.53(d), and is subject to the twenty year patent term provisions of 35 U.S.C. 154(a)(2).

[21] Appl. No.: 08/578,307

[22] Filed: Dec. 26, 1995

[51] Int. Cl.⁶ ........................................................ G06F 17/60
[52] U.S. Cl. .................................. 705/4; 705/35; 705/38
[58] Field of Search .................................. 395/204, 235; 705/4, 35, 38

[56] References Cited

U.S. PATENT DOCUMENTS

| | | |
|---|---|---|
| 3,634,669 | 1/1972 | Soumas . |
| 4,642,768 | 2/1987 | Roberts . |
| 4,722,055 | 1/1988 | Roberts . |
| 4,752,877 | 6/1988 | Roberts et al. . |
| 4,831,526 | 5/1989 | Luchs et al. . |
| 4,837,693 | 6/1989 | Schotz . |
| 4,839,804 | 6/1989 | Roberts et al. . |
| 4,876,648 | 10/1989 | Lloyd . |
| 4,953,085 | 8/1990 | Atkins . |
| 4,969,094 | 11/1990 | Halley et al. . |
| 4,975,840 | 12/1990 | DeTore et al. . |
| 5,136,502 | 8/1992 | Van Remortel et al. . |

(List continued on next page.)

OTHER PUBLICATIONS

Treasury Report, "Treasury Releases Long–Awaited Study on Taxation of Life Insurance Products", 90 TNT 70–12, Apr. 2, 1990.

Kevin Wright, "Mission: Policyholder Rescue", Best's Review–Life–Health Insurance Edition, v 88, n 10, pp. 48–51, Feb. 1988.
"Insurance Company's Retroactive Rate Credits are Deductible Compensation", 89 TNT 30–12, Feb. 7, 1989.
"Bank Purchases of Life Insurance", OCC Bulletin 96–51, Office of the Comptroller of the Currency, Department of Treasury, Sep. 20, 1996.
George Jacson, "Cash Value Life Insurance vs. Term Insurance/Investment Combinations", Tax Adviser, v 24, n 8, pp. 521–530, Aug. 1993.
James Ballew, "Policy Provisions in Plain English", Life & Health Insurance Sales, v 135, n 5, pp. 41–43, May 1992.
"Bank Purchases of Life Insurance", Banking Circular No. 249, Office of the Comptroller of the Currency, Department of Treasury, May 9, 1991.
26 U.S.C. 264 (Internal Revenue Code; Certain Amounts Paid in Connection with Insurance Contracts).
26 U.S.C. 7702 (Internal Revenue Code; Life Insurance Contract Defined).

*Primary Examiner*—Emanuel Todd Voeltz
*Assistant Examiner*—William N. Hughet
*Attorney, Agent, or Firm*—Douglas P Dreyer

[57] ABSTRACT

The invention relates to a system for analyzing and managing at least one lender owned life insurance policy on behalf of a lender to improve loan profitability, achieve investment results from the COLI, and to prevent investment loss as a result of adverse tax law changes. The system tracks mortgage balances, applies vesting schedules, determines appropriate face amounts, policy loan amounts and/or cash withdrawals to maximize return on investment for the lender. The system also reacts to adverse changes in the tax laws by adjusting the form of the insurance policy to a term policy with an increased face value and terminating the policy. Termination of the policy involves additional cash withdrawals which are used to pay back policy loans. The system further illustrates past and future performance of the policy based upon assumptions of tax law changes. Finally, the system monitors and administers the MCPP program on an ongoing basis.

20 Claims, 7 Drawing Sheets

U.S. PATENT DOCUMENTS

| | | |
|---|---|---|
| 5,191,522 | 3/1993 | Bosco et al. . |
| 5,202,827 | 4/1993 | Sober . |
| 5,231,571 | 7/1993 | D'Agostino . |
| 5,291,398 | 3/1994 | Hagan . |
| 5,429,506 | 7/1995 | Brophy et al. . |
| 5,446,885 | 8/1995 | Moore et al. . |
| 5,479,344 | 12/1995 | Keziah, Jr. . |
| 5,673,402 | 9/1997 | Ryan et al. .............................. 395/238 |

SYSTEM AND METHOD FOR IMPLEMENTING AND ADMINISTERING LENDER-OWNED CREDIT LIFE INSURANCE POLICIES

FIELD OF INVENTION

The present invention relates to a computer software and hardware system for analyzing and managing mortgage owned life insurance used as an investment and as a means of increasing loan profitability. More specifically, it relates to a system which compiles and maintains information relating to customer mortgage balances, determines amounts of lender owned life insurance, has the ability to adjust the insurance policies in response to adverse tax law changes, and performs necessary administrative procedures.

BACKGROUND OF THE INVENTION

Mortgage Customer Protection Plan™ (MCPP) is a life insurance plan that allows financial organizations, such as banks ("lenders"), to provide free mortgage insurance to its customers ("borrowers"). Using MCPP™, the lender takes out insurance on the borrower(s) seeking the mortgage. Often, the mortgage will be applied for jointly (e.g., married couples) or with a co-signor. The lender pays the life insurance premiums and is the beneficiary. In the case of death of one of the borrowers, the lender can use the death benefits from the insurance policy to offset the remaining mortgage balance for the surviving borrower(s). Using MCPP™, the lender can provide this benefit without any direct cost to the borrower. The lender can fund MCPP entirely by the revenues gained from the cash build-up of the insurance policies and the tax-benefits associated with such policies.

A number of life insurance plans are available to lenders to increase lender revenues, thus increasing the number and quality of lender services and decreasing the need to profit from the average customer. These plans, however, are complicated, subject to strict federal regulations, and offer little or no benefit to the borrowers or public at large. Further, none of these plans relate to insuring customer mortgages.

One such plan is known as Corporate-Owned Life Insurance (COLI). COLI plans generally work as follows: a company buys life insurance on workers and retirees naming the corporation as beneficiary; the cash value of the policy then builds as an asset. Since COLI is life insurance, the interest on amounts borrowed from the life insurance plan are tax-deductible. In addition, the actual build-up of cash in the life insurance policy also is not taxable. Upon the death of the insured, the death benefits are not taxable as well.

Despite these advantages, COLI has many drawbacks. Congress recently placed limits on the amount of interest that can be deducted from borrowing from the plan. Moreover, pending federal legislation if enacted may prevent lenders from deducting any interest on policy loans from the plan. In addition, only the cash value of the policy with the loans deducted are allowed to be reported on the balance sheets for accounting purposes, which can often affect corporate net worth.

Another life insurance plan available to lenders is Bank-Owned Life Insurance (BOLI). BOLI is often used to fund health care liabilities for lender employees. Under a BOLI plan, a lender purchases insurance on a group of employees. The group can be all full time employees or a group of managers, e.g., assistant vice presidents and above. The lender pays the premium(s) and owns the cash value of the polices. The lender is also the beneficiary of the insurance. The employees may or may not receive any of the insurance benefits directly depending upon the discretion of the financial organization. The coverage does not replace or interfere with any other insurance provided by the lender, e.g., group term life insurance and so forth.

The lender earns income from the policies from two sources. The first is from the growth of the cash value of the policy. The cash value is the monetary value of the policy if surrendered. It is also the value which is counted as an asset by the lender. The cash value increases each year as interest is added by the insurance company. The second source of income comes from the insurance proceeds paid to the lender when an employee dies. The payment of insurance proceeds and the earnings from the cash value are income tax-free (unless surrendered).

Similar to COLI, the traditional BOLI plan has inherent drawbacks which makes it unattractive to the banking industry. In particular, lenders are not comfortable making a large premium payment to a carrier that would go into the general account or portfolio of the carrier. If the carrier has a credit difficulty or an impediment to making payments, the lender becomes the general creditor of the carrier. Thus there is a problem with maintaining control over the lenders' transferred assets. Further, given the long-term nature of the plan, lenders were concerned with the long-term credit worthiness of the insurance carriers and the delay in cash flow (since it is predicated on the death of an employee). Another problem with traditional BOLI products is that lenders can only lend 15% of shareholder equity to a single entity, and only 25% total of a lender's shareholder equity can be used for life insurance. Thus, if a favored carrier of the lender has existing insurance products, the premium amount the lender could pay to the carrier would be limited. Finally, the plan fails to provide an after-tax interest gain exceeding straightforward and vastly less complicated investments such as Treasury Bills.

In addition to the above mentioned problems with traditional life insurance plans, COLI and BOLI are both subject to strict governmental regulations. Both plans must adhere to the insurable interest laws of the applicable State. Moreover, both plans are regulated through federal guidelines established by the Office of the Comptroller of the Currency (the "OCC"), and OCC Banking Circular 249 (the "Circular").

The OCC provides federal regulatory oversight for a national lender's purchase of life insurance policies. The Circular provides general guidelines for national lenders to use in determining whether they may purchase a particular life insurance product. Under the Circular, a national lender may purchase life insurance only for a purpose incidental to the business of banking, and not as an investment. A life insurance policy is considered to be purchased and held for non-investment purposes if it satisfies either of two tests. Test A applies if a lender purchases life insurance to indemnify itself against the death of an individual, i.e., key-person insurance. Test B applies when the lender purchases life insurance in conjunction with providing certain employee compensation or benefits, or when the insurance constitutes all or part of the benefit. Both tests involve complicated and strict compliance rules. For example, based upon reasonable actuarial benefit and financial assumptions, test B requires that the present value of the projected cash flow from the policy must not substantially exceed the present value of the projected cost of the associated compensation or benefit program liabilities. Accordingly, lenders are required to operate within strict parameters and are subject to heavy regulatory oversight.

Finally, both COLI and BOLI provide only indirect benefits to the bank employees which are insured by these plans by reducing a bank's health benefits costs, thereby providing better health benefits to the employees at reduced rates. These plans do not offer any direct benefits to the insured, or the public at large.

MCPP™ offers the same benefits as COLI and BOLI without the above-mentioned drawbacks. MCPP™ is an insurance policy on borrowers for which the lender pays the premiums and is the beneficiary. All or part of the proceeds, in the event of a death of a borrower with an outstanding mortgage, will be used to offset all or part of the mortgage balance. This benefit is provided without any direct cost to the borrower, in order to create business advantages through increased mortgage activity and persistency. The death benefits from the policies are not taxable income to the lender, therefore the cash value growth of the insurance is tax deferred. Accordingly, MCPP has favorable tax consequences when used as an investment.

Corporate owned life insurance (COLI) is often used for financing corporate benefit liabilities. The rate of return of a COLI investment is increased if the employer borrows against the cash value of the insurance policy. This allows the employer access to a significant portion of the value of the policy before the death of the insured employee. If a large portion of the cash value of the policy is borrowed and used to pay the premiums and/or interest on outstanding loans, substantial returns on investment can be achieved with minimal cash outlays. A similar result can be achieved with MCPP, in addition to the significant business advantages that MCPP provides.

More importantly, MCPP is not subject to federal oversight. The Circular permits a lender to insure mortgage borrowers, but is silent with respect to any regulatory requirements such as limits on policy coverage amounts or premium payments.

Additional advantages of MCPP to a lender is a relatively low rate plan on the insurance, increased market share through the offering of free or low-cost mortgage insurance, elimination of current credit losses, increased per capita advertising efficiency since the conversion rate for buyers is higher (e.g., for every 100 mortgage applications, a higher number of applicants will choose to borrow money from a lender offering free or low-cost mortgage insurance), and leverage to promote those mortgage products and terms which are most profitable to the lender (e.g., balloon mortgages versus fixed-rate mortgages).

The problems associated with implementing and administering a MCPP plan according to the needs of a particular financial organization are considerable. For example, there are problems associated with determining the insurable interest for each policy. Insurable interest is the amount of death benefits the financial organization could take out for each borrower. Insurable interest differs from state to state, and involves significant calculations factoring in such variables as mortgage amount, premium costs and interest on the premium costs. Moreover, even a small lender could easily provide mortgages for 50,000 borrowers. To calculate the insurable interest for each borrower would be nearly impossible without a readily implementable computer program that accounts for the state to state differences.

Yet another problem is the size and sheer volume of administrative functions associated with the ongoing management of the MCPP plan. These administrative functions include paying premiums for large numbers of borrowers ("mortgage pools"), and determining the premiums required for maintaining death benefits equal to the insurable interest on a periodic basis for accounting and tax purposes. Developing a programmatic approach to these administrative functions is critical to the ability to effectuate MCPP efficiently, economically and accurately.

Another problem revolves around the tax benefits provided by MCPP. Under current tax laws, the interest paid on policy loans, for a leveraged MCPP arrangement, is tax deductible. In the event that the tax laws change such that interest paid on policy loans are no longer tax deductible, however, a MCPP policy efficiently, economically and accurately with outstanding policy loans becomes a net loss investment. Therefore, companies are hesitant to use MCPP policies with borrowing of cash value due to the possibility of a tax law change. One known method for reducing losses from a MCPP if the tax laws change is to convert the outstanding cash value in the policy to a paid up insurance policy of a lesser face value. The interest on the loans, however, must still be paid as long as the policy is in force. A program and method is needed to reduce such losses without causing an administrative and accounting nightmare.

MCPP offers lenders and the public significant benefits. The MCPP plan, however, is new and only recently introduced to the insurance and banking industry. Consequently, no attention has been paid to developing computer software and computer hardware systems for handling the above-enumerated problems associated with the MCPP plan in order to minimize actuarial, management and accounting time and costs and to render such a plan feasible for large numbers of mortgages.

SUMMARY OF THE INVENTION

In view of the foregoing, there exists a significant need in the art for a computer system which enables lenders to effectively and efficiently invest in mortgage customer life insurance and manage through the computer system the process on large blocks of business, while minimizing the possible adverse effects if the tax laws change.

It is a primary object of this invention to provide a computer software and hardware system for procuring life insurance policies and for administering operations of the MCPP policies and processes.

It is another object of the invention to provide a computer software and hardware system for determining the insurable interest for a life insurance policy.

It is yet another object of the invention to provide a computer software and hardware system for determining the insurable interest for a life insurance policy on a state by state basis.

It is still another object of the invention to provide a computer software and hardware system having a database for storing insurable interest formulas necessary for determining the insurable interest for a life insurance policy on a state by state basis.

It is a further object of the invention to provide a computer software and hardware system for determining a premium value for a life insurance policy covering the life of a borrower.

It is another object of the invention to provide a computer software and hardware system for determining a premium ratio used in determining a premium value for a life insurance policy covering the life of a borrower.

It is yet another object of the invention to provide a computer software and hardware system for determining the imputed premium cost for each policy for accounting and tax purposes.

It is still another object of the invention to provide a computer software and hardware system for determining the imputed premium cost for each policy by calculating the premium costs associated with the death benefits necessary to cover the insurable interest of a policy.

It is another object of the invention to provide a computer software and hardware system for determining the imputed premium cost for each policy on a periodic basis.

It is a further object of the invention to provide a computer software and hardware system which automatically adjusts the structure of the MCPP product to account for changes in tax laws.

Another object of this invention is to provide a computer software and hardware system for performing periodic sweeps of social security records to identify and initiate death claims for MCPP insured borrowers who have died.

It is yet another object of this invention to provide a computer software and hardware system for administering policy settlements for lender insured borrowers who have died.

It is still another object of this invention to provide a computer software and hardware system for administering collateral assignments from the lender to the borrower and borrower to lender.

It is still another object of this invention to provide a computer software and hardware system for administering and accounting for the tax issues surrounding debt cancellation.

These and other objects and advantages are achieved by a computer software and hardware system that administers at least one lender owned life insurance policy on behalf of at least one of a plurality of borrowers. The computer system compiles borrower financial and health-related information used for enrolling the borrower in the MCPP plan. In enrolling the borrower, the system determines the insurable interest for each borrower's policy according to the appropriate state regulatory guidelines. Formulas for determining the state regulatory guidelines are stored in a database, contained in a mass storage device such as a hard-drive or CD-ROM.

The computer system also administers the MCPP plan. Such administration includes a means for automatically paying premiums on the policy, determining an amount of cash to withdraw from the life insurance policy based upon the cash value of the policy and for withdrawing the amount of cash from the policy as a policy loan, paying interest on the policy loan, determining the premiums required for maintaining death benefits equal to the insurable interest for accounting and tax purposes on a periodic basis, and collecting death benefit proceeds of the policy.

The computer system also manages MCPP policies to achieve maximum investment return under both current tax laws and potentially adverse changes. This system determines the amount of insurance needed based on mortgage balance and anticipated premiums, the amount of policy loans to take under the current tax environment, and, in the event of tax law changes, determines the extent of cash withdrawals from the cash value of a policy to be used to pay back policy loans and converts the policy to term life insurance with the premium coming from the cash value. The system also provides reports of the past investment performance of the policy and illustrates expected future performance under various assumptions.

With these and other objects, advantages and features of the invention that may become hereinafter apparent, the nature of the invention may be more clearly understood by reference to the following detailed description of the invention, the appended claims and to the several drawings attached herein.

DETAILED DESCRIPTION OF A PREFERRED EMBODIMENT

Figure 1:
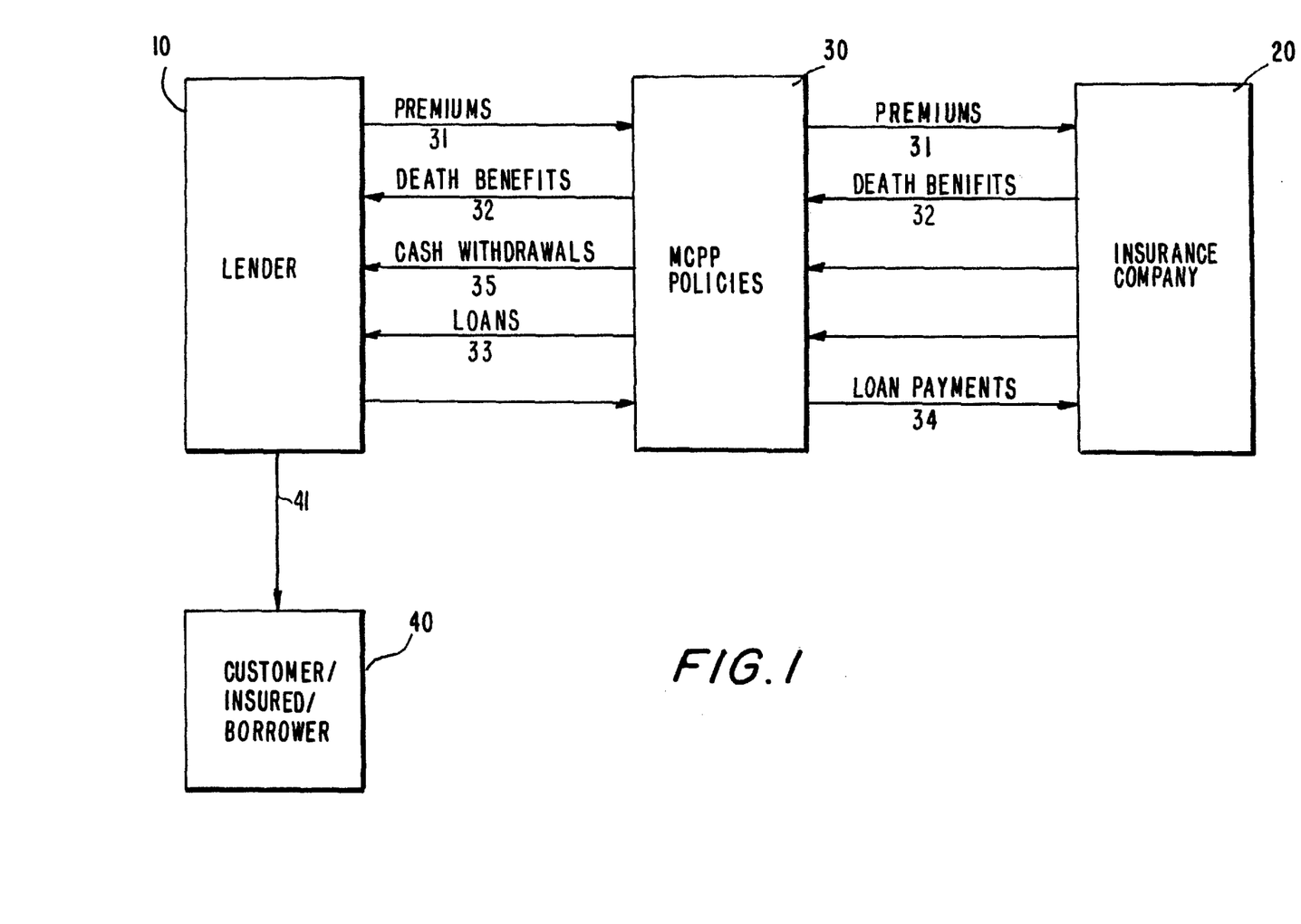
FIGS. 1 is a block flow diagram of the MCPP computer system according to a preferred embodiment of the invention.

Referring now in detail to the drawings wherein like parts are designated by like reference numerals throughout, there is illustrated in FIG. 1 a block-flow diagram of the computer system organization 100 according to a preferred embodiment of the present invention. One of the purposes of this organization is to provide an insurance product which mitigates balance sheet recognition of the costs associated with unpaid mortgage balances, late fees and administrative charges associated with the death of a borrower, while also generating earnings sufficient to cover the costs of MCPP and provide no-cost or low-cost mortgage insurance to borrowers.

Operation of Investment Organization

FIG. 1 illustrates the elements of a MCPP policy 30 used as an investment vehicle. The flow of data, as represented in FIG. 1 is only a preferred embodiment. Other organizational schemes can be employed. A lender 10 has a borrower 40 to which certain benefits 41 are owed, such as mortgage payoffs. In order to finance the benefits 41, the lender 10 invests in a MCPP policy 30. The lender 10 pays premiums 31 to an insurance company 20. Upon the death of the insured borrower 40, the insurance company 20 pays death benefits 32 due under the policy 30 to the lender 10. The lender can remove cash from the insurance policy 30 through loans 33 or cash withdrawals 35. The lender 10 makes loan payments to insurance company 20. Both loans 33 and cash withdrawals 35 are limited by the cash value in the policy. Withdrawals immediately reduce the cash value and death benefit of the policy. Loans are collateralized by the cash value of the policy and must be repaid from the future death or surrender proceeds. If loans are taken, the lender must eventually pay back to the insurance company the principal and interest on the borrowed amount. Typically, MCPP products only require interest payments and the principal remains outstanding. Any outstanding loan principal is deducted from the face amount of the policy prior to payment upon death of the insured.

There are two types of MCPP plans available to the lender. One is a full funded plan, the other is a leveraged plan. By way of example, in a full funded plan a lender puts down 500,000,000 to buy a pool of insurance. If the lender makes 5.5% on 500,000,000, the lender makes 62,500,000 a year which is non-taxable. If the funding cost for the lender is 3%, the lender makes a sizable profit.

In a leveraged transaction, if the lender wants to pay 700,000,000 into the plan, the bank pays 100,000,000 a year for seven years instead of paying 700,000,000 all at one time. In years 1, 2 and 3, the lender borrows from the insurance company to pay the premium, and therefore is not providing any direct cash payments to the carrier. During years 4, 5, 6 & 7, the insurance carrier uses the plan's dividends to pay the premium, so again the lender has no direct cash outlay. If the interest on the policy loans for the first three years is 10 percent, 30,000,000 goes to the insurance company and is tax deductible to the lender. Of that 30,000,000, 29,000,000 is counted as an asset on the lender's balance sheets due to the cash build-ups in the insurance plan. This provides the lender significant revenue potential and tax savings. This occurs because the interest on the policy loans are deductible, but the value that the interest creates, which is now a lender asset, is tax free. So every dollar placed into the leveraged transaction provides approximately 35 cents of profit. Since the dollar cost is 60 cents, after tax, the lender receives 95 cents back from the dollar after the insurance company removes it's profit. Consequently, a leveraged transaction creates cash flow, whereas a full funded transaction provides accounting gains. The leveraged plans creates this cash flow through tax arbitrage. Further, the rate of return is theoretically infinite.

The MCPP system is capable of implementing and administering both a full funded plan and a leveraged plan, as described more fully below.

The Computer System

Figure 2A:
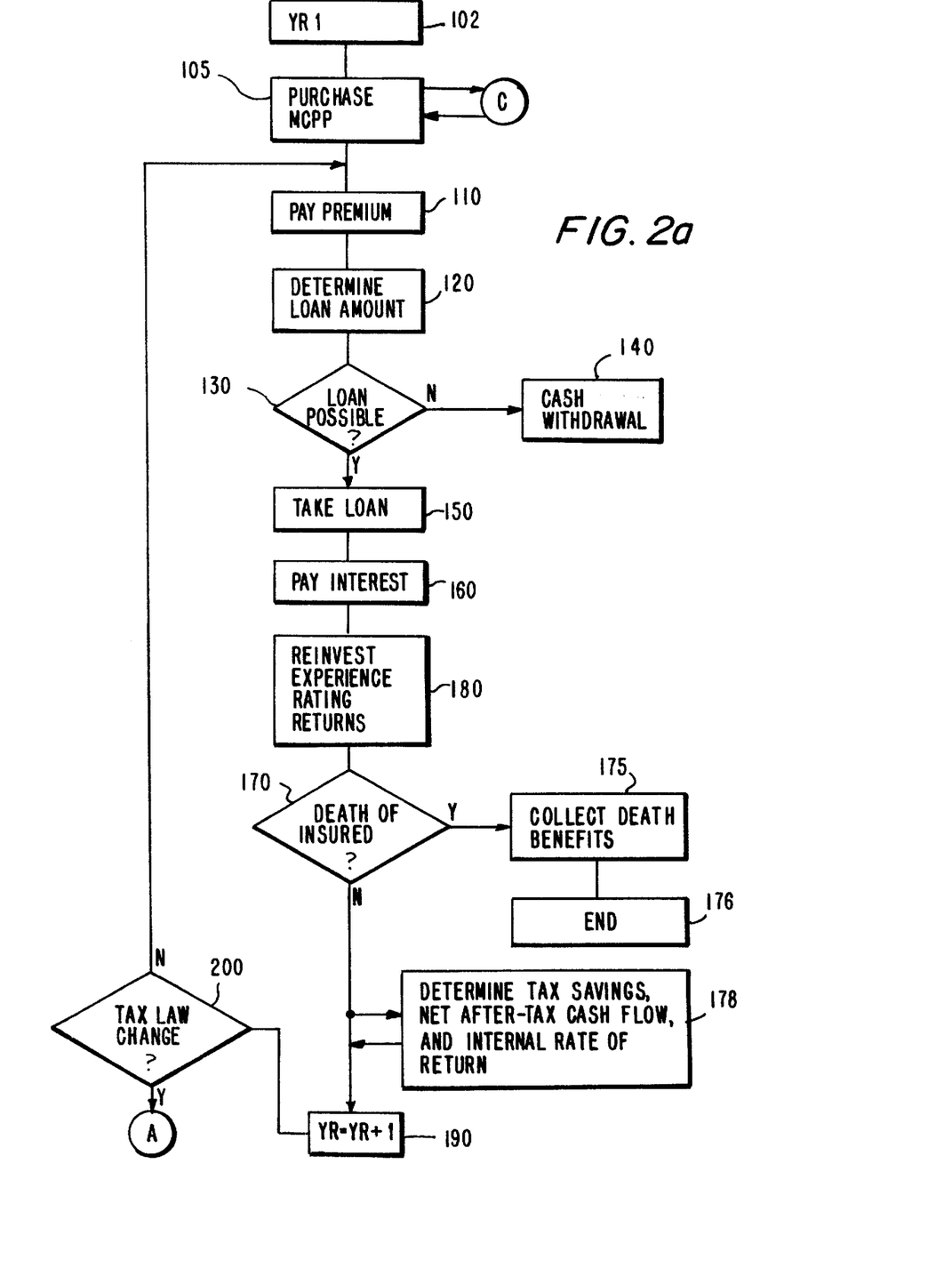
FIGS. 2a–2b are function flow diagrams of the computer system operators according to a preferred embodiment of the present invention.

FIG. 2a illustrates a more detailed block flow diagram of the computer system for managing a MCPP policy according to the present invention. In the first year 102, a MCPP policy is purchased at step 105. The premium calculated at step 105 is paid at step 110. Then, the maximum loan amount which can be taken under the policy is determined at step 120. The maximum loan amount is based upon the cash value of the policy. The computer system then determines whether a loan can be taken out at all at step 130. In order to qualify for interest deductions, loans cannot be taken against the policy more than three out of the first seven years. A loan is taken at step 150 up to the maximum amount. In those years when a loan is not to be taken, cash withdrawals can be made at step 140. As noted previously, a cash withdrawal simply reduces the cash value and face value of the policy. At the end of the year, the interest on the outstanding loans is paid 160, and any experience rating returns, dividends or excess interest credits are reinvested 180. Experience rating returns, dividends or excess interest credits are payments to a policy holder with respect to death experience of the insured population. If the insured population experiences fewer deaths, or the insurance company has better than expected investment returns, a portion of the increased value is returned to the policy holder.

If the insured dies 170, then the lender 10 collects the death benefits at step 175 and the policy ends at step 176. The bank can either use the death benefits to pay off the remaining mortgage balance, or simply perform debt cancellation and write off the loan. This is performed using the breakout figures in the accounting portion of the software described infra. By performing debt cancellation, the bank receives added tax advantages. The borrower, however, would be required to report this debt cancellation as taxable income. This is still attractive to the borrower since he or she would merely have to pay taxes on the mortgage amount canceled, rather then the remaining mortgage amount. If the lender opts for using debt cancellation, the system will manage the accounting and tax issues relating to the transaction at step 178.

If the insured has not died, financial information is gathered such as lender tax savings, net after-tax cash flow, and internal rate of return at step 178. The counter for the number of years is updated at step 190. If the tax laws have not changed at step 200, the process is repeated in the next year.

Figure 2B:
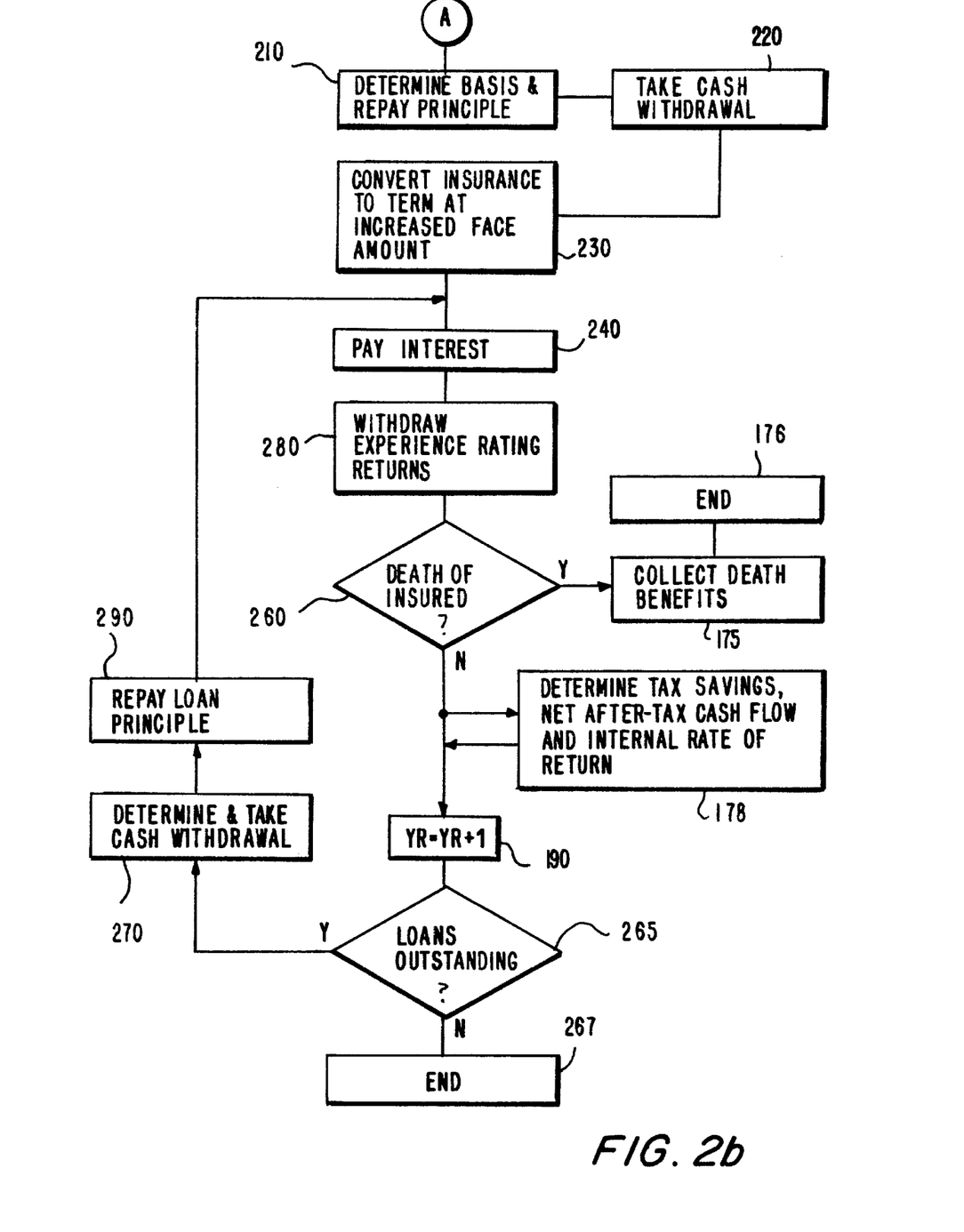

If the tax laws change, at step 200, such that interest on policy loans is no longer tax deductible, then management of the system changes. In the year the tax laws change, the system determines the basis in the policy less cash withdrawals made to date and the lender repays loan principle up to this amount at step 210. The lender then makes a cash withdrawal of the same amount at step 220 which automatically accounts for that withdrawal.

According to the non-forfeiture provisions of the policy, the system converts the policy to term insurance with an increased face amount at step 230. The premium for the term insurance reduces the cash value of the policy. The policy loans carry over to the term insurance, but the loan interest rate is reduced according to the terms of the policy. The lender 10 then pays interest on any outstanding loans at the reduced rate at step 240. The experience rating returns, dividends or excess interest credits are withdrawn in an amount that leaves only the guaranteed cash value as required by state regulations at step 280, and provides funds for paying loan principal and/or interest. If the insured dies, then the lender 10 collects the death benefits at step 175 and the policy ends at step 176. As in ordinary operation, if the insured does not die (step 260) at the end of the year, the lender takes a cash withdrawal (step 270) which is used to repay the loans (step 290) or the interest (step 240). The end of year withdrawal also must leave at least the guaranteed cash value. Further, the end of year loan repayment must reduce the amount of the loan to no more than the maximum loan value of the term insurance, which is based on the next following end of year cash value discounted for loan interest. If there are not any outstanding loans at step 265, the policy is terminated at step 267.

The amount of the cash withdrawal to take at step 210 and 270 are based upon the cash value of the policy at the time and the outstanding loans and the premium amounts for the term insurance, in order to achieve certain design objectives of the lender. The design objectives could be to terminate the policy as fast as possible or to maximize total return on investment from the policy. The system determines the cash withdrawal and loan repayment amounts such that the cash value is completely depleted at the same time that the loans have been completely repaid.

In addition to determining the appropriate loan and/or cash withdrawal amounts during the original period and termination period, the computer system also illustrates past performance and projects future performance of the MCPP product under assumed scenarios. This requires step 178 for determining performance. Although death benefits are only collected upon the death of the insured, the computer system determines the expected death benefit to be received in each year. The expected death benefit is determined by the likelihood of the insured dying during the given year multiplied by the face amount of the policy less any outstanding loans or cash withdrawals. The lender will typically have a MCPP policy on many mortgagors. With many policies, the law of large numbers indicates that the actual death benefits received for the group will be approximated by the sum of the individual expected death benefits. Thus, the expected death benefits can be used to illustrate expected yearly returns from the death benefits of a large group of policies.

In addition, the financial analysis portion of the computer system determines tax savings, after-tax cash flow and internal rate of return for the MCPP investment for each year. The tax savings relate to the deductibility of policy loan interest payments. The after-tax cash flow considers premium payments, loan proceeds, cash withdrawals, expected death benefits and tax savings. The internal rate of return relates to the growth in cash value and/or cash receipts from loans, withdrawals, or death benefits, relative to cash outlays. The analysis can be performed with an assumption that the tax law change occurs in any given year. It can also be illustrated without a tax law change to emphasize the effects of the change on investment potentials.

Figure 3A:
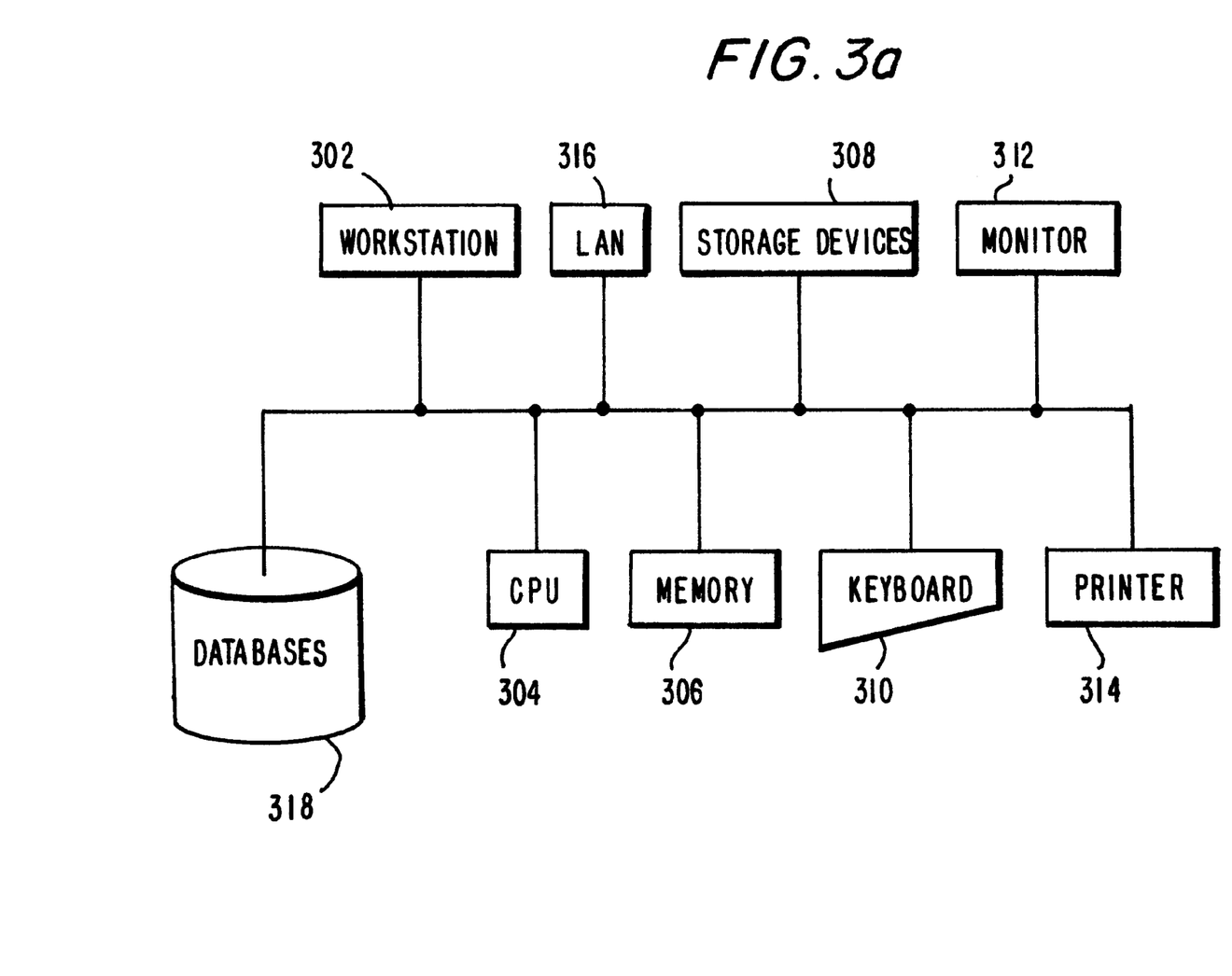
FIG. 3a is a hardware block diagram of the computer system according to a preferred embodiment of the present invention.

Referring now to FIG. 3a, the preferred embodiment of the system for analyzing and managing mortgage owned life insurance is shown in hardware form. A typical computer workstation 302 will contain a central processing unit 304, a main memory 306 and can be coupled to storage devices 308 such as magnetic disks, an input device such as a keyboard 310 or mouse, an output device such as a computer monitor screen 312 and a printer 314. One or more such storage devices may be utilized. A typical workstation is a DELL personal computer with an Intel Pentium microprocessor, 8 megabytes of RAM and a 120 megabyte hard drive.

The system may be coupled to a Local Area Network 316 (LAN) or other communications channel in order to link with other computer workstations, and to have access to data from outside storage devices 308. A typical LAN would be a Novell network.

Databases 318 that maintain information such as insured borrower information, policy information, and tax law information, will also be accessible to the workstations 302 via the LAN 316. These data can be retrieved locally, or across an appropriate wide area network if stored off-site.

Figure 3B:
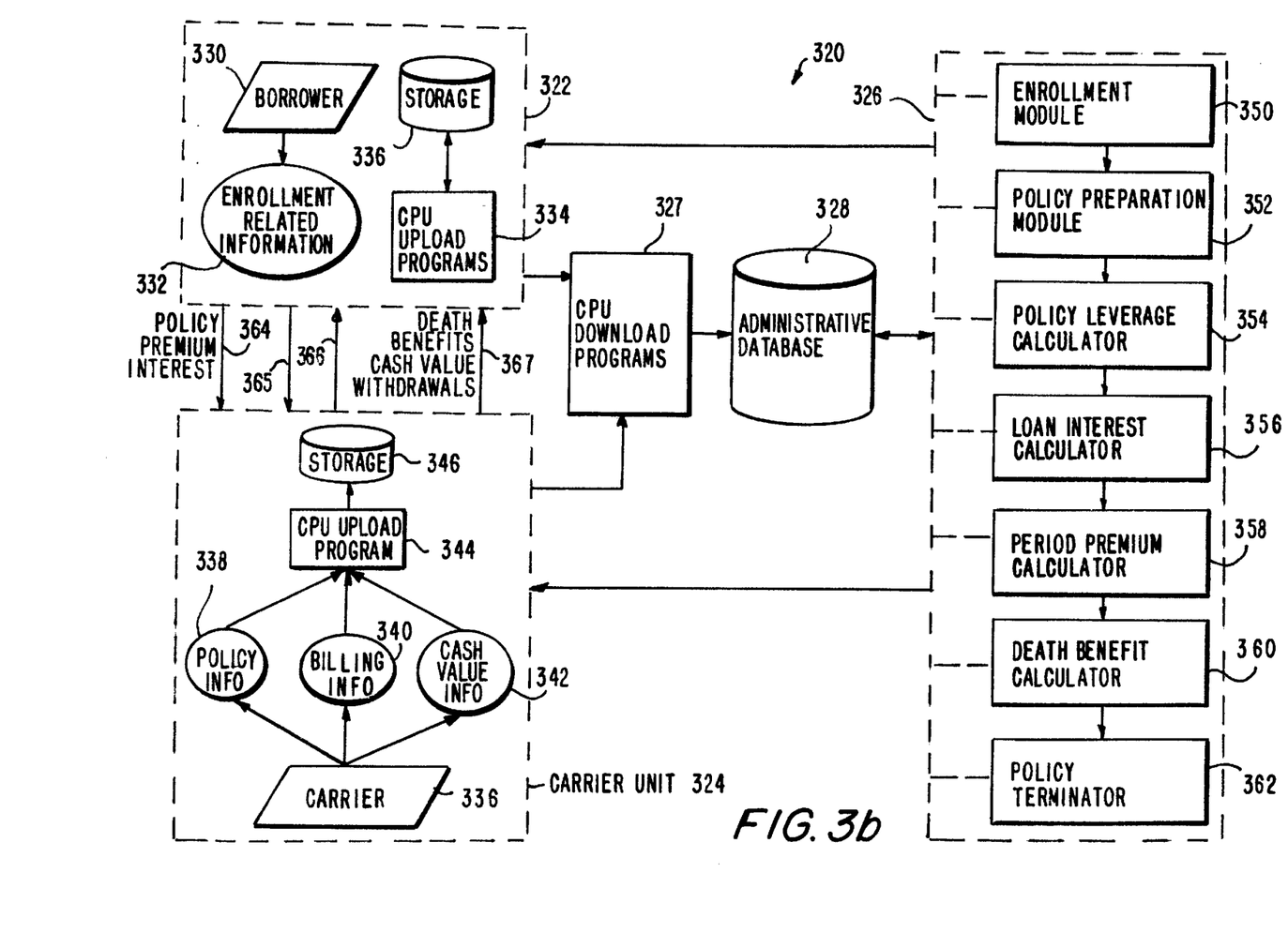
FIG. 3b is a system diagram illustrating the flow of the information in accordance with preferred embodiment of the present invention.

Reference is now made to FIG. 3b, wherein a system diagram illustrates the flow of information in accordance with a preferred embodiment of the present invention. The system is generally depicted at reference numeral 320 and includes 4 main components. The four components are a policy enrollment unit 322 preferably located at the lender location; a carrier unit 324 preferably located at the carrier location; an administrative unit 326 preferably located at the administration location; and an administrative database 328.

Policy enrollment unit 322 is essentially a computer or a dumb terminal located at a lender location that receives borrower information 330 and formulates it into enrollment-related information 332. Enrollment-related information 332 is then input into a central processing unit 334 and stored in a storage device 336. The stored data is then downloaded from policy enrollment unit 322 to CPU 327 and into administrative database 328. This information may be transmitted in any conventional form, such as by direct modem to modem transfer or through the transmission of an electronic disk. Since massive amounts of information are being transmitted, conventional compression technology may be desired. CPU 327 is required to decompress the information and to format it in the form required by administrative database 328. Administrative database 328 stores information in conventional manners. such as any relational database.

Carrier unit 324 includes a carrier 336 that provides policy information 338, billing information 340, and cash value information 342. Policy information 338, billing information 340 and cash value information 342 are transmitted to CPU upload program 344 and stored in storage device 346. The information stored in storage device 346 is then transmitted by carrier unit 324 to CPU 327 for storage in administrative database 328.

Administrative unit 326 includes a plurality of interrelated modules, The modules include an enrollment module 350, a policy preparation module 352, a policy leverage calculator 354, a loan interest calculator 356, a period premium calculator 358, a death benefits calculator 360, and a policy terminator 362. Each module performs a particular function in the enrollment and/or administration process.

Enrollment module 350 receives enrollment-related information 332 in the form received by administrative database 328. This generally includes enrollment-related data (such as financial data and health data) on an experience rated group of borrowers (a large group). Enrollment module 350 evaluates the enrollment-related data of each individual borrower and determines whether predefined criteria are met for enrollment within the plan. Such Predefined criteria are related to at least financial and health-related information. Policy enrollment module 350 must then notify policy enrollment unit 322 of the eligible borrowers 330 and also provides policy preparation module 352 with information regarding the eligible borrowers.

Policy preparation module 352 next prepares insurance policies for the eligible borrowers as determined by enrollment unit 350. Policy preparation module 352 receives enrollment-related information 332 from administrative database 328 and determines premium values for the policies and desired cash values to receive desired levels of cash value growth. The lender must then fund the policies by payment of a premium 364. Premium payment may be completed by wire transfer or the like.

Policy leverage calculator 354 reviews the policies prepared by policy preparation module 352 and determines an amount of cash which may be withdrawn from the policy. The leverage calculation is based at least in part on applicable state and federal laws and regulations set by the Office of the Controller of the Currency (OCC). The leverage amount is then transmitted to carrier unit 324. The carrier then pays the lender the borrowed amount through a cash value withdrawal 367 that is preferably completed by wire transfer or the like.

The loan value is stored in administration database 328 and is transmitted to loan interest calculator 356. Loan interest calculator 356 periodically (the period depends upon the agreement) calculates interest owed to the carrier 336 from the lender. The interest amount and backup calculations are transmitted to carrier 336 and the lender.

On a periodic basis, the term portion of the whole life policy must be calculated. Period premium calculator 358 calculates the premium for each individual policy and sums the same to determine the total premium for each period. The calculation unit must search the database to determine, for example, which policies are still in effect, who has died, who has paid off a mortgage, etc. These calculations then may be transmitted to the carrier and the lender.

Upon the death of insureds, death benefit calculator 360 determines the payout required by carrier 336. The payment depends upon the value of the policy that is stored in administration database 328. Additionally, the program receives a sweep of social security number deaths to determine which of the multiplicity of policies had deaths.

Policy terminator 362 may terminate the policy upon many different conditions, such as death of the insured, pay-off of the mortgage or upon an adverse tax law change. Policy terminator 362 first determines an amount of money to be withdrawn from the life insurance policy. This is based on the cash value build-up in the whole life portion of the policy.

Next, the policy is converted to a paid-up, term life insurance policy having a higher face amount than the original whole life policy, wherein the policy loan is converted to a term policy loan on the converted life insurance policy. The system then determines any outstanding interest owed prior to the date of termination; policy terminator 362 then notifies carrier 336 and the lender of the outstanding interest, so that appropriate payment may be made. Policy terminator 362 then searches death records to determine whether any death benefits are due. Any death benefits are reported to carrier 336 and the lender for payment. Lastly, policy terminator 362 searches administrative database 328 and determines the value of all term loans, so that the principal may be repaid by the lender. In the preferred embodiment, policy terminator 362 determines the termination interest, termination death benefits and principal owed at termination and determines one payment owed between carrier 336 and the lender.

Figure 4A:
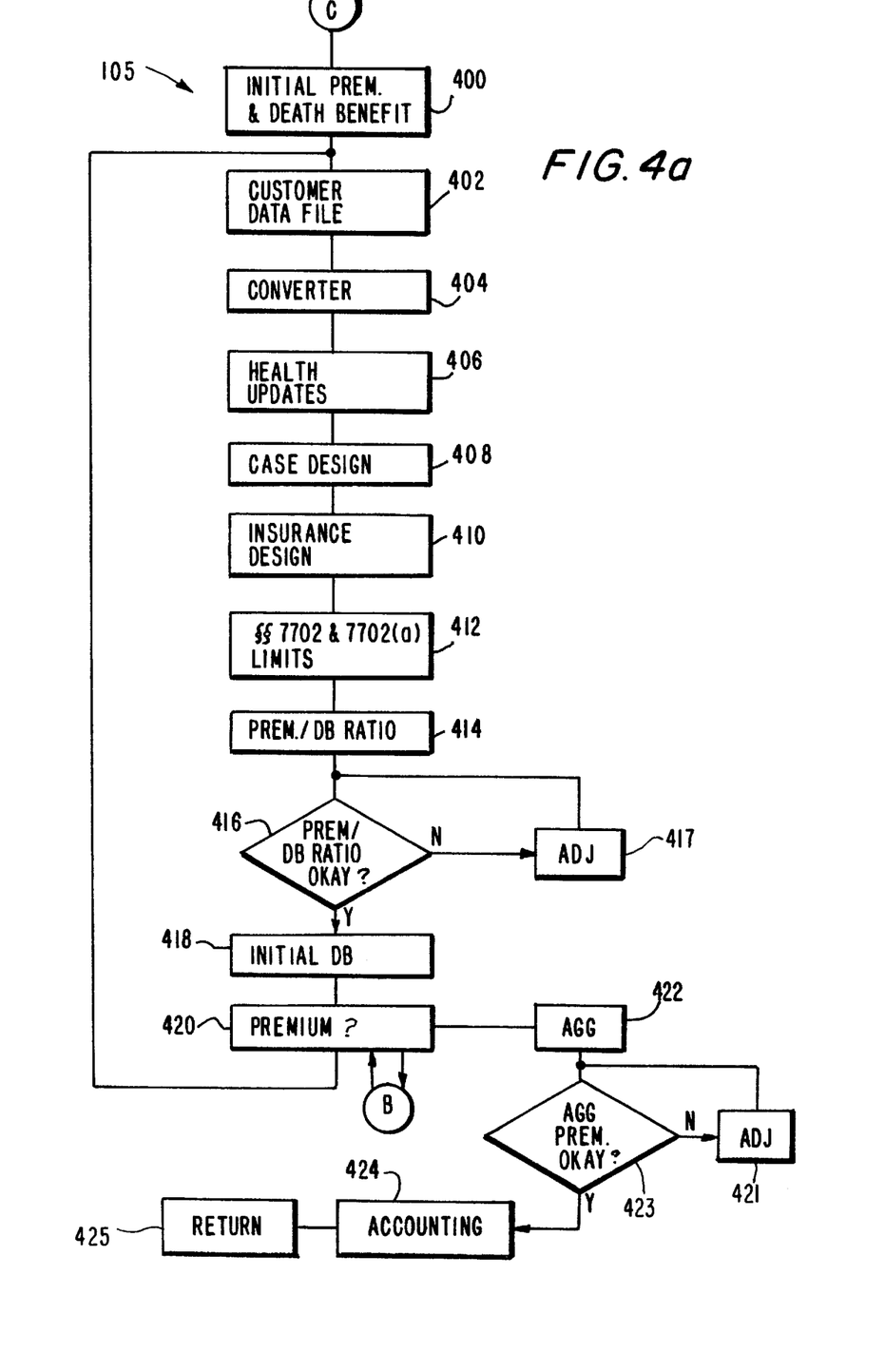
FIGS. 4a–4b are block flow diagrams of the system according to the preferred embodiment of the present invention.

Referring now to FIG. 4a, the purchase MCPP step 105 of FIG. 2a is illustrated in detail. The system must determine initial premium and death benefits ("DB") for the MCPP purchase at step 400. The lender provides the MCPP system with information on the borrower such as the borrower's name, address, internal loan number, state and initial mortgage balance, in the form of a data file at step 402. The MCPP system converts the data file into a format compatible with the MCPP system at step 404. The MCPP operators then update the borrower's information with data such as the borrower's age, borrower's sex, and health related information at step 406. The reason the MCPP system operators perform this step rather than the lender is due to federal and state discrimination laws.

At step 408, the MCPP system operators input into the system information for case design about the purchaser of the MCPP product (which is the lender). This input data includes recovery target criteria, vested or total mortgage balance, mortgage plus insurance premium, mortgage plus premium and interest cost, interest cost recovery rate, aggregate premium target, and desired premium/DB ratio.

The MCPP operators inputs data used for insurance design at step 410. These input variables include the type of insurance product, policy design, premium payment duration, policy leveraging strategy, carrier single payment (NSP) or seven pay factors ("leveraged"), and minimum premium payment allowed.

Once the input variables for the system are entered, the system performs various calculations to structure the MCPP purchase and determine premium amounts and death benefits. Specifically, at step 412, the system determines the maximum initial premium/DB ratio based on Internal Revenue Circular (IRC) §§ 7702 and 7702(a) limits for each age and sex combination for the borrower (MEC rules). This limit calculation is specific to the type of insurance product purchased.

At step 414, the system determines the initial premium/DB ratio based on the MCPP insurance product. This is based, in part, on the minimum premium needed to keep the MCPP polices in force.

The system tests if the desired premium/DB ratio is within the product minimum and maximum range for all ages at step 416, and makes any necessary adjustments, at step 417. At step 418, the system calculates the initial DB based on the recovery target criteria inputted at step 408. DB is determined according to the following formula:

DB=Mortgage+Premium+Interest Recovery.

At step 420, the system determines the resulting premium for each individual based on the premium/DB ratio. At step 422, the system sums individual premiums. The system then moves to step 423 to determine if the aggregate premium is within the acceptable premium range inputted at step 408. If the determination in step 423 is that the aggregate premium is not acceptable, the necessary adjustment is made in step 421. The system calculates the aggregate DB, and breakout portion attributable to mortgage, premium recovery and interest costs at step 424. The system then returns to the main routine at step 425 which is reference numeral 110 of FIG. 2a.

Figure 4B:
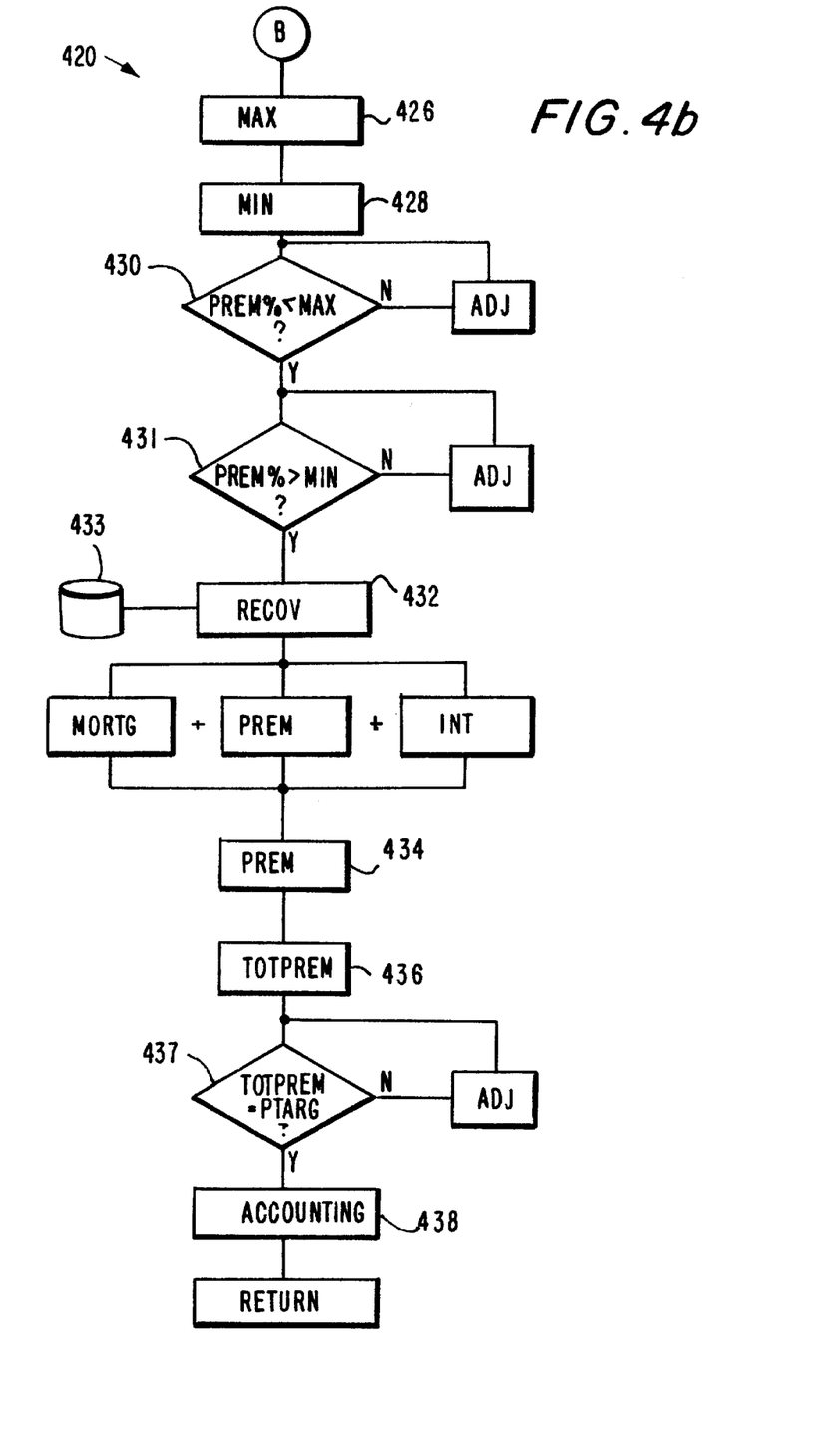

Referring now to FIG. 4b, the preferred embodiment for determining the premium costs and DB at step 420 is shown. The maximum initial premium/DB ratio (MAX) is calculated at step 426. Assuming PREMYRS=1, MAX equals the MAXPREM allowed by IRC §§ 7702 and 7702(a). MAXPREM is defined by NSP if the DESIGN=MEC, and by a seven-pay factor if DESIGN=Non-MEC. The insurance carrier provides the NSP factor or seven-pay factor (i.e., calculation methodology) which varies by PROD, AGE and SEX, and is stated as premium per $1000 of DB. MAX is determined by the following formulas:

If MEC: MAX=1/NSP*1000/100 for MEC     1.

If non-MEC: MAX=1/seven-pay factor*1000/100.     2.

Additional calculations may be needed depending on product and case design.

The system determines the minimum initial premium/DB ratio (MIN) at step 428. Assuming PREMYRS=1, MIN is determined by approximating the MINPREM to keep the policy in-force through the life of the contract, given current assumptions. The MINPREM calculation methodology is provided by the insurance carrier, and is stated as premium per $1000 of DB. MIN is calculated according to the following formula:

MIN=1/MINPREM*1000/100.

As with MAX, additional calculations may be needed depending on product and case design.

The system tests to determine whether the premium/DB ratio (PREM %) is within the desired range, and if not makes necessary corrections. At step 430, if PREM % is less than MAX then no modifications are needed. If not, the system reduces PREM % by 0.5 points (i.e., 10% to 9.5%) and retests until PREM % is less than MAX. At step 431, if PREM % is greater than MIN then no modifications are done. If not, the system increases PREM % by 0.5 points (i.e., 10% to 10.5%) and retests until PREM % is greater than MIN. These tests are done for each borrower since MAX and MIN ratios vary by PROD, AGE and SEX. Any changes to PREM % are logged by the system.

At step 432, the system calculates the initial DB based on the recovery target criteria (RECOV) inputted in step 408. RECOV is determined by state insurable interest regulations where the MCPP policy is to be issued. The system looks to database 433 which holds various RECOV formulas on a state-by-state basis, and pulls the appropriate values for RECOV. The applicable state is typically part of the customer data file provided by the lender, or can be hard-coded into the system according to lender.

The following calculations are performed depending on the applicable state. If RECOV equals the mortgage amount (MORTG), then DB equals MORTG. If RECOV equals MORTG plus PREM %, then DB equals MORTG/(1–

PREM %). If RECOV equals MORTG plus PREM % plus interest costs (INT), then DB equals MORTG/(1−PREM %−INT), where INT is calculated by the following formula:

$$INT=[PREM \%*(1+INT)\hat{}INSYRS-PREM]/DB,$$

where INSYRS equals the remaining years of the insurance contract.

Once the premium/DB ratio is determined, the system calculates the resulting premium for each borrower (PREM) based on the premium/DB ratio (PREM %) at step 434. The formula used to determine PREM is as follows:

$$PREM=DB*PREM \%.$$

If PREM is less than the minimum premium payment allowed for policy (MINPMT), PREM % is adjusted at step 430.

At step 436, the individual borrowers are summed (TOTPREM) to determine at step 437 if the aggregate (AGG) premium is within the predetermined target (PTARG). If not, they are adjusted. TOTPREM is equal to AGG(PREM). If TOTPREM is equal to PTARG, then TOTPREM is acceptable by the system. If not, the system user is notified. The system user would have the choice of accepting TOTPREM, reducing PREM %, changing RECOV, or changing the insured group.

At step 438, death benefits for each borrower in the mortgage pool are summed (TOTDB), and the system performs a breakout between portions attributable to mortgage (MORTG), premium recovery (PREM) and interest cost (INT). TOTDB is equal to AGG(DB). TOTMORTG is equal to AGG(MORTG). If RECOV is equal to MORTG plus PREM plus INT, then TOTINT is equal to TOTDB minus TOTPREM minus TOTMORTG. If RECOV is not equal to MORTG, then TOTINT is equal to zero (0). The system can perform this breakout on a periodic basis, such as weekly, monthly or yearly.

The system can also perform this breakout for individual borrowers. In the event the Internal Revenue Service takes the position that mortgage insurance provided by the lender 10 to the borrower 40 is taxable, the system will use the breakout to calculate the premium costs imputed to the borrower.

Further, the breakout allows the lender 10 to calculate the amount of death benefits required to cover the cost of the remaining mortgage for the borrower, the principal of which gets paid down with each mortgage payment thereby requiring periodic recalculation. This amount also takes into account any late fees or penalties incurred by the borrower. The system administers and tracks the necessary transactions necessary to ensure the death benefits from the policy are properly allocated in the amounts necessary to pay off the currently remaining mortgage amounts, late fees and penalties. This is important since the lender owns 100% of the MCPP policy. To provide the borrower with mortgage insurance, the lender endorses to the borrower a portion of the death benefit that is exactly equal to the outstanding mortgage balance, late fees and penalties. Simultaneously, the lender has the borrower sign a collateral assignment form to collaterally assign that endorsed benefit back to the lender so that the lender can pay off the outstanding mortgage balance, late fees and penalties. In this manner, the lender can pay off the outstanding mortgage balance, late fees and penalties at the time of the borrower's death, while avoiding the tax issues surrounding debt cancellation or forgiveness discussed supra. If the lender, however, has absorbed as many MCPP policies of which it is capable, the lender still has the option of debt cancellation.

The accounting module which performs the breakout is also capable of administering and accounting for split dollar insurance policies. If the lender uses such policies, the system determines and manages the policies, and the accounting and tax issues associated with those policies. For example, the system will compute how much taxable income would be imputed to the borrowers on the insured mortgage amount. The system will subtract the imputed amount from the loan interest the borrower paid to the lender for the year. As a result, the borrower would claim the loan interest on his or her tax return minus the imputed benefit. For example, assume a borrower had a $200,000 mortgage at 7.5% and had paid the lender $15,000 in loan interest. Because of the $200,000 in insurance that the lender is giving to the borrower, the computer system automatically imputes $95 of income to the borrower. The computer system subtracts $95 from the loan interest. As a result, the borrower would only claim $15,000 minus $95, or $14,905, on his or her tax return. The system would interface with the loan servicing software of the lender so that the IRS form 1098s would be reported accurately to the borrowers.

The system provides information about individual borrowers and the mortgage pool in aggregate in the form of a census data file which is provided to an insurance carrier. The output information provided for each borrower includes the initial unpaid mortgage balance, the issue age and sex data, the initial DB, the initial insurance premium, and the initial premium/DB ratio. The output information provided for the mortgage pool in aggregate includes the assumption summary, initial total insurance premium and DB, breakout of mortgage, premium and interest components of DB, DB splits among mortgage payout and debtor portion, and a log file indicating any problems.

The administrative support subsystem performs periodic sweeps of social security records to identify death claims for borrowers insured by the lender 10 under MCPP. Periodic borrower status updates are also done to identify borrowers who have died and were covered in the plan. This information is used as a basis for determining whether a policy has endowed. Endowment means that the life of the insured matches that defined by the policy. Thus, if the life insurance policy is a life to 95 policy, and if the insured lives to age 95, the policy is endowed.

At this point, alternative settlement options are evaluated. Typically, the cash value of the policy is left deposited with the insurance carrier, and the bank pays taxable interest on the gain from that point on since it technically no longer constitutes life insurance. Once the insured passes away, the bank receives the death benefits tax free. If the policy is surrendered before the insured passes away, all the accrued interest over the policy basis is treated as taxable gain. Thus, depending on the bank's need for capital at the particular moment of endowment drives the selection of the appropriate settlement option.

Although a preferred embodiment is specifically illustrated and described herein, it will be appreciated that modifications and variations of the present invention are covered by the above teachings and within the purview of the appended claims without departing from the spirit and intended scope of this invention.

What is claimed is:

1. A computer system that administers an experience rated group of lender owned life insurance policies on behalf of a plurality of borrowers, said system comprising:

a policy enrollment unit for receiving borrower information from a first information source and receiving carrier information from a second information source;

a purchasing unit for analyzing borrower information and carrier information and determining a premium value for said policies covering the lives of said plurality of borrowers; and a policy administrator unit for administering said policies, comprising:

a premium device for paying premiums on said policy;

a cash removal unit for determining an amount of cash to withdraw from said life insurance policy based upon the cash value of the policy and for withdrawing said amount of cash from said policy as a policy loan;

an interest payor unit for paying interest on said policy loan;

an accounting unit for determining premium costs imputed to said borrower, calculated on a periodic basis;

a collecting unit for collecting death benefit proceeds of said policy; and a policy terminator unit for terminating said life insurance policy when an adverse tax law change occurs, said policy terminator unit including:

a termination cash unit for determining an amount of cash to withdraw from said life insurance policy;

a policy converter unit for converting said policy to a paid-up term life insurance policy in accordance with said carrier information, wherein said policy loan is converted to a term policy loan on said converted term life insurance policy;

a termination interest payor unit for paying interest on said policy loan outstanding on said converted term life insurance policy;

a termination collector unit for collecting death benefits proceeds of said converted term life insurance policy; and a loan repayor for paying principal of said term policy loan.

2. The system according to claim 1, further comprising a mass data storage device which stores formulas for calculating each states insurable interest guidelines.

3. The system according to claim 1, wherein the purchasing unit includes an insurable interest unit for determining the insurable interest for said policy according to a state's regulatory guidelines.

4. The system according to claim 3, wherein the accounting unit determines the premium costs imputed to said mortgage by calculating said premiums required for maintaining death benefits equal to said insurable interest.

5. The system according to claim 1, wherein said premium device, said cash removal unit, and said interest payor unit operate on an annual basis.

6. The system according to claim 1, wherein said cash removal unit determines the amount of cash to be withdrawn so as to maximize the rate of return to the lender over the expected life of the policy.

7. The system according to claim 1, further comprising an illustrating unit for predicting the premiums to be paid, the expected death benefit proceeds to be received, and the amount of cash to be withdrawn in future years.

8. The system according to claim 7, wherein said illustrating unit further includes investment return means for determining at least one of tax savings, after-tax cash flow, and internal rate of return from said policy.

9. The system according to claim 1, further comprising a monitoring unit for storing said premiums paid, the death benefits proceeds received and the amount of cash withdrawn.

10. The system according to claim 9, wherein said monitoring unit includes an investment return monitor for determining at least one of tax savings, after-tax cash flow, and internal rate of return from the life insurance policy.

11. The system according to claim 1, wherein said term policy loans have a different interest rate than said policy loans.

12. The system according to claim 1, wherein said policy administrator unit further includes an experience return unit for collecting experience rating returns, dividends or excess interest credits.

13. The system according to claim 12, wherein said policy administrator unit further includes a reinvestor unit for reinvesting said experience rating returns, dividends or excess interest credits.

14. The system according to claim 1, wherein said policy terminating unit further includes an experience return unit for collecting experience rating returns.

15. A mortgage borrower life insurance system that administers an experience rated group of life insurance policies on a respective plurality of mortgagors, said computer system comprising:

means for receiving a first group of data from a Lender regarding said plurality of mortgagors, and receiving a second group of data having a set of criteria from an insurance company;

means for selecting a third group of data representative of mortgagors from said first group of data meeting said set of criteria from said second group of data;

purchasing means for procuring a plurality of life insurance policies on said selected mortgagors represented by said third group of data, said polices being issued as experience rated policies; and policy managing means for managing said plurality of life insurance policies, said policy managing means including:

premium means for paying premiums on each of said plurality of life insurance policies;

collecting means for collecting death benefit proceeds of each of said life insurance policies; and policy termination means, for terminating each of said plurality of life insurance policies when an adverse tax law change occurs, said policy termination means including;

termination cash means for determining an amount of cash to withdraw from each of said plurality of life insurance policies; and policy conversion means for converting each of said plurality of life insurance policies to a respective paid-up term life insurance policy in accordance with said second group of data, wherein said policy loans on each of said plurality of life insurance policies are converted to term policy loans on said respective converted term life insurance policies.

16. The system according to claim 15, wherein the lender provides an at least partial mortgage payoff to a borrower at death without any direct cost to the borrower.

17. The system according to claim 16, wherein the at least partial mortgage payoff is financed at least in part by an economic benefit of the life insurance policies.

18. The system according to claim 15, wherein said policy managing means manages said policies to maximize the rate of return to the lender.

19. The system according to claim 15, further comprising an illustrating means for predicting the performance of the experience rated group of life insurance policies.

20. The system according to claim 15, wherein said policy conversion means converts each of said plurality of life insurance policies to a respective paid-up term life insurance policy having a higher face amount than each respective life insurance policy in accordance with said second group of data.

* * * * *